March 17, 1942.  C. B. MOORE  2,276,505
PRESSURE CONTROLLER
Filed April 9, 1938  3 Sheets-Sheet 1
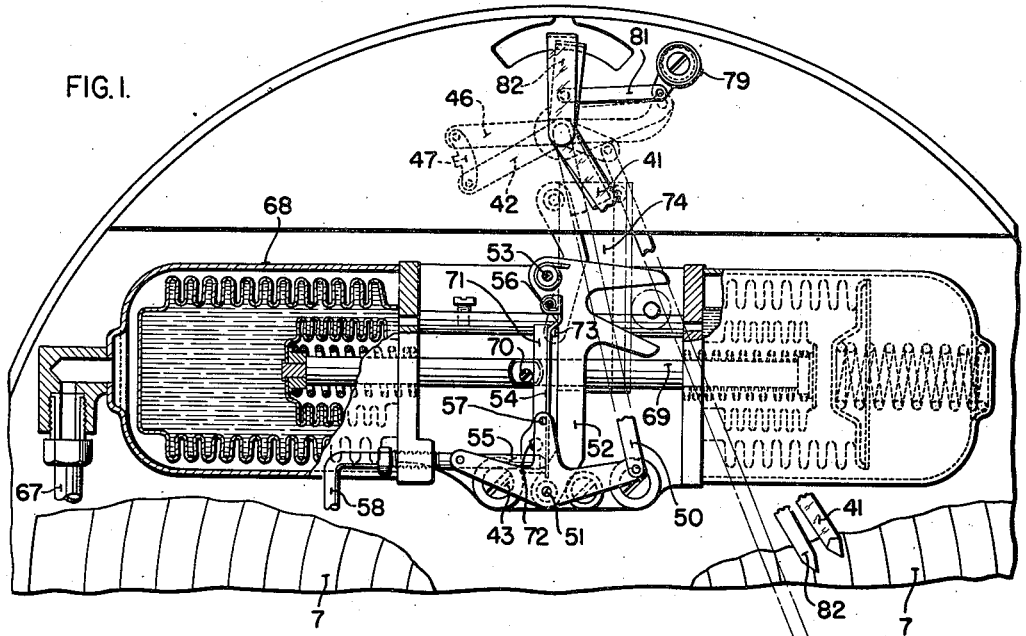
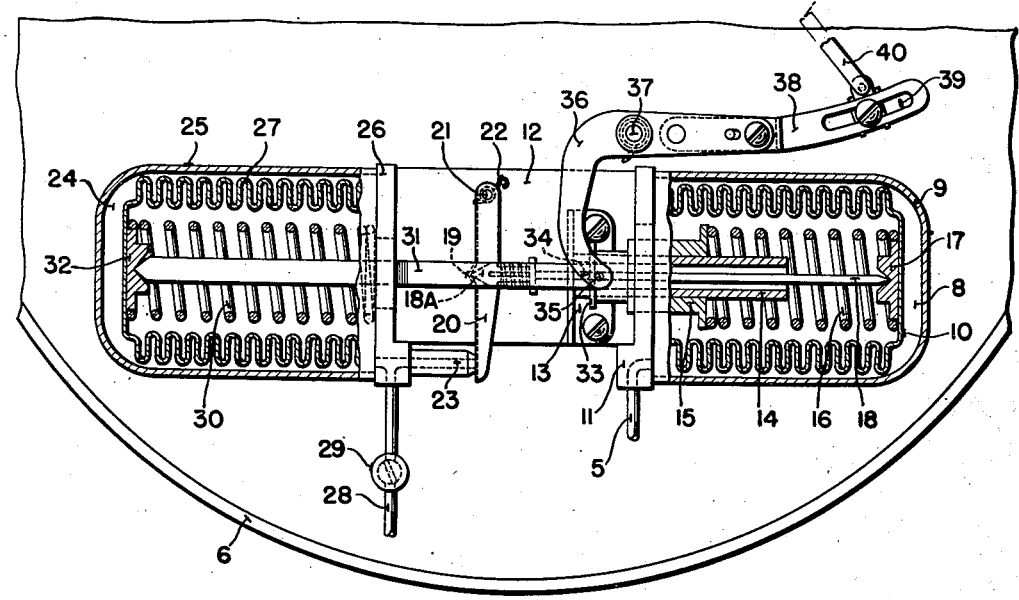
INVENTOR.
COLEMAN B. MOORE
BY *George M. Mersbaugh*
ATTORNEY March 17, 1942.  C. B. MOORE  2,276,505
PRESSURE CONTROLLER
Filed April 9, 1938  3 Sheets-Sheet 2
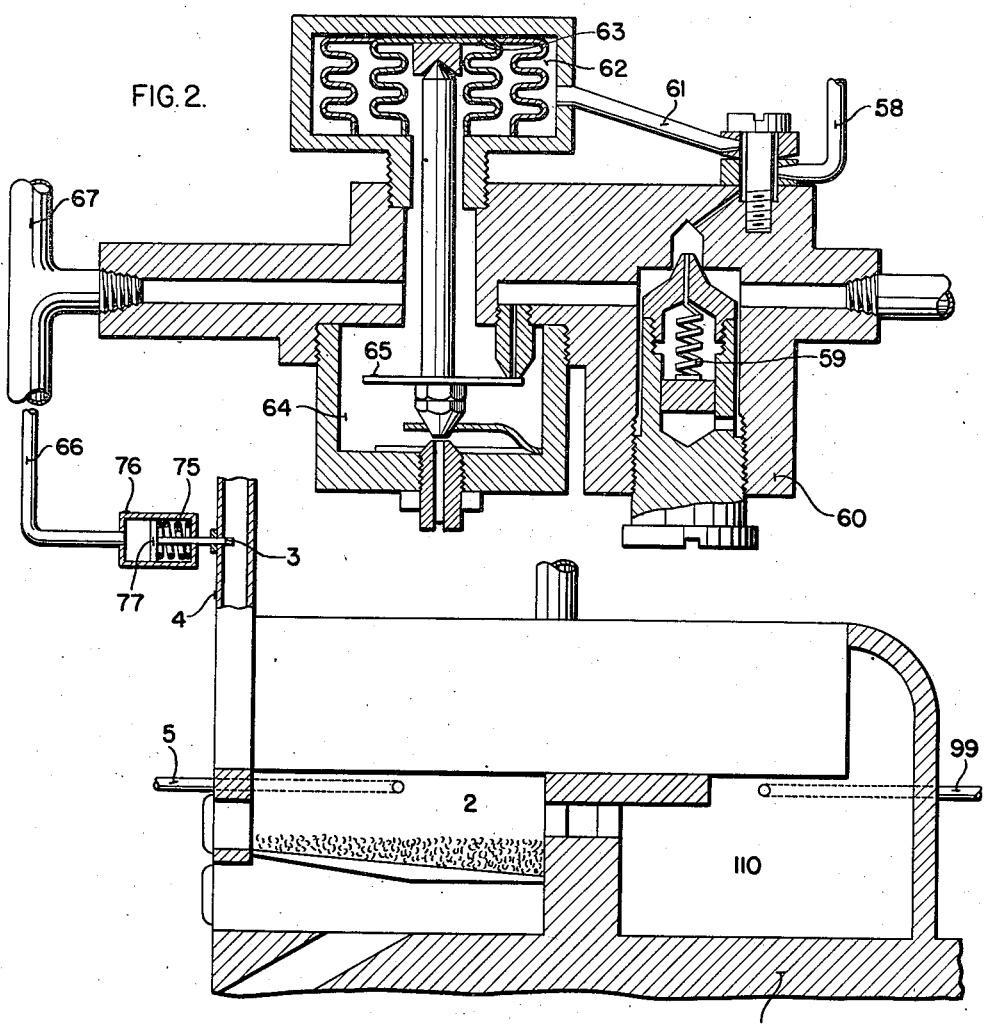
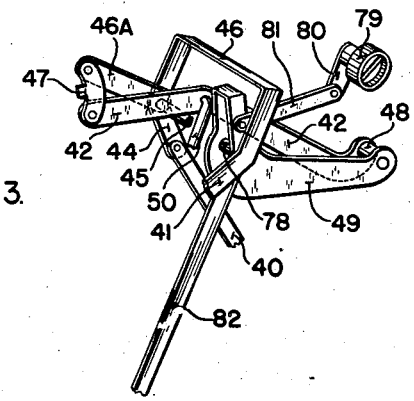
INVENTOR.
COLEMAN B. MOORE
BY George W. Beauchamp
ATTORNEY March 17, 1942.    C. B. MOORE    2,276,505
PRESSURE CONTROLLER
Filed April 9, 1938    3 Sheets-Sheet 3

INVENTOR.
COLEMAN B. MOORE
BY George M. Wennershoup
ATTORNEY

Patented Mar. 17, 1942

2,276,505

UNITED STATES PATENT OFFICE 2,276,505

PRESSURE CONTROLLER

Coleman B. Moore, Carroll Park, Pa., assignor to The Brown Instrument Company, Philadelphia, Pa., a corporation of Pennsylvania Application April 9, 1938, Serial No. 201,102

16 Claims. (Cl. 137—153)

The present invention relates to pressure gauges and regulators particularly adapted to be used to measure and control very low pressures. At the present time, most low pressure recorders and controllers are of the inverted bell type which have the lower end of the bell immersed in a suitable sealing liquid. A line from the pressure to be measured is then led to the inside of the bell, so that as the pressure varies, the bell will be raised and lowered. The height of the bell is then a measure of the pressure, and as it is raised or lowered, its movement is imparted to a suitable controlling mechanism. This type of pressure controller has several serious objections, the most pronounced of which are the necessities for keeping the instrument containing the liquid exactly level and the difficulty of maintaining the liquid free from contamination.

An object of this invention is to overcome the above-mentioned objections, along with others, by providing a measuring instrument in which the unknown pressure is balanced against a known and variable pressure. The balancing movement is used to move a pen across a chart or to move an indicator and to actuate a controller. In a specific embodiment of the invention, I use a pair of opposed bellows, one of which is connected to the space in which the pressure is to be measured, and the other of which is connected to a supply of air at constant pressure. The second bellows is provided with a bleed nozzle whose opening is adjusted in accordance with the expansion and contraction of the first bellows. As the second bellows varies in size, it, through suitable linkage, gives a follow-up movement to the first bellows, moves a pen across a chart, and actuates a controller. Because a pair of bellows are used, there is no requirement that the instrument be placed in an absolutely level position, and there is no liquid to become contaminated or lost. There is also provided ample power to move the pen, regardless of the position of the instrument, and to actuate a suitable controller.

It is also an object of this invention to use the same type of apparatus to measure a differential pressure. In such a case, the two pressures, the difference between which is to be measured, are imposed upon a pair of bellows, and a connecting link therebetween is moved in accordance with a variation in the differential. The movement of this connecting link serves the same purpose as the variation in the size of the first bellows in the above-mentioned modification, namely to vary the opening of a bleed nozzle in a bellows supplied with air under a constant pressure.

This arrangement makes a compact instrument which can be placed in a casing of ordinary size and shape and one which does not need any special care or handling after it has been installed.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a view partly in section showing my new measuring apparatus and a control mechanism to be used in combination therewith, and shown with the casing broken and the bottom half off-set with respect to the top half;

Fig. 2 is a view in section of a furnace whose pressure is to be controlled and a control valve therefor;

Fig. 3 is a perspective view of certain linkage used in Fig. 1;

Figure 4:
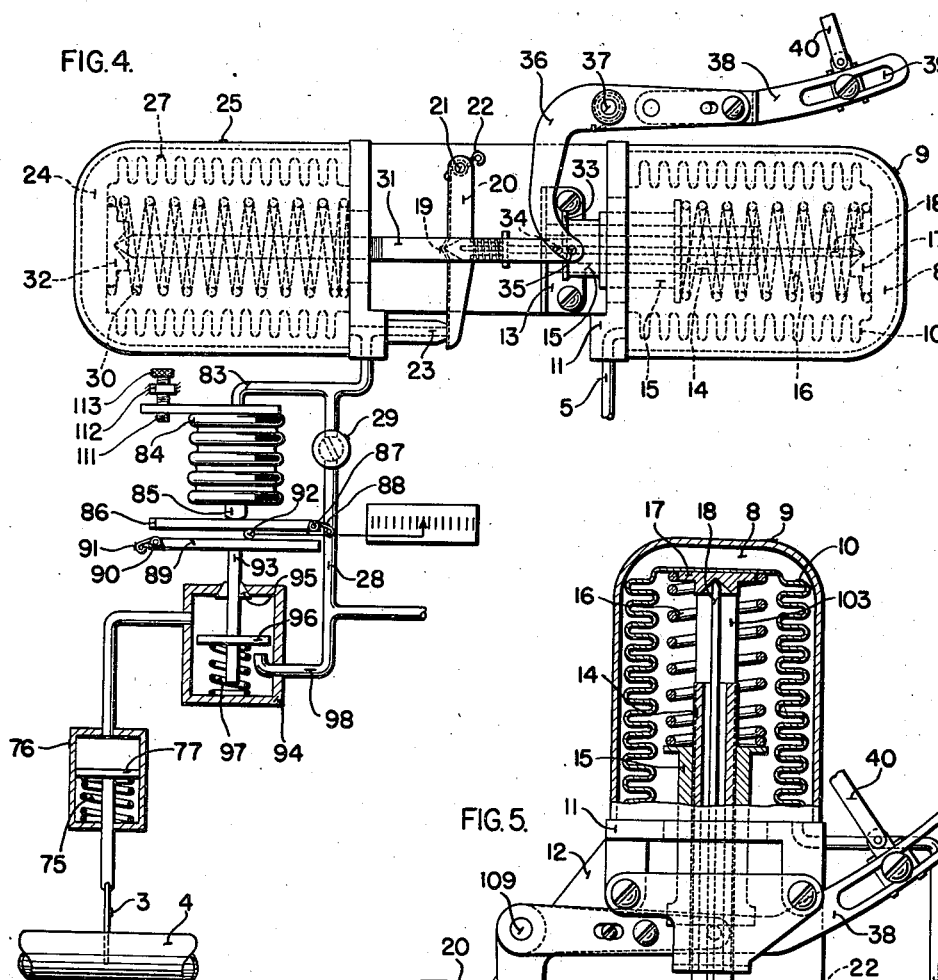
Fig. 4 is a view partly in section of another type of controller to be used with my apparatus.

The invention is shown as being used to adjust a damper in a furnace in order to keep the furnace pressure at a constant value. This showing, however, should be understood to be only a typical example of one of many uses for my novel apparatus, and should not be considered as limiting.

Referring to Figure 2, there is shown a furnace 1 of conventional design having a grate and a fire box 2 in which it is desired to keep a constant pressure. This is accomplished by giving a closing adjustment to a damper 3 in the stack 4 as the pressure decreases and an opening adjustment as the pressure increases. A duct 5 opening in the fire box leads to a measuring and regulating instrument responsive to furnace pressures that is shown in Fig. 1 and which, through mechanism to be described, adjusts the damper 3. The instrument is housed in a casing 6 of conventional circular design which contains a motor (not shown) to rotate a chart 7 upon which is made a record of the pressure variations. This casing is provided with a door (not shown) which serves to protect the apparatus therein. The apparatus now to be described is located in the casing and behind the chart.

The duct 5 extends from the furnace in through an opening provided in casing 6 to a chamber 8 formed between a cap member 9 and a bellows 10 that varies in length as furnace pressure varies. The cap and bellows are fastened to a base member 11 which is supported in a suitable manner on a plate 12 that is attached to the back of the casing. A bracket 13 is attached to support 12 and has an opening in it, to which is fastened a tube 14 that extends through an opening in the base member 11 into the interior of the bellows 10. Slidably mounted on this tube 14 is an abutment member 15 upon the end of which bears one end of a loading spring 16 for the bellows, the other end of which engages a seat 17 attached to the movable end wall of the bellows.

As the pressure in chamber 8 varies due to pressure changes in the furnace, the bellows varies in length and thereby sets other mechanisms into operation to oppose the pressure change in chamber 8, power-position the pen, and actuate a regulating mechanism. To accomplish these operations, a rod 18, that has one end positioned in seat 17 and the other end engaging a depression 19 in a flapper 20 pivoted at 21 and biased in a counter-clockwise direction by a spring 22, is shifted axially as the bellows 10 changes in length to move the flapper nearer to or permit it to recede from a nozzle 23 which communicates with a chamber 24. The rod 18 is adjustable in length in order to provide an accurate initial setting of the flapper 20 with respect to the nozzle 23 by having its tip 18A adjustably threaded upon the end of rod 18. Rotating the tip 18A with respect to the rod 18 will accurately change its length enough to compensate for any normal variations in the length of bellows 10.

The chamber 24 is supplied with air from any suitable constant pressure source through a duct 28 and at a constant rate that is controlled by the restriction 29. The air escapes from chamber 24 through the opening 23 at a rate that is dependent upon the throttling action of flapper 20 on the opening and produces a corresponding proportionate variation in the pressure in chamber 24. The chamber is formed by the space between a cup-shaped cap member 25 and a bellows 27, both of which are fastened to a base member 26 also extending from support 12. If, for example, the pressure in chamber 8 increases, the bellows 10 will collapse and shift rod 18 to the left, thus moving flapper 20 nearer to nozzle 23. Since the air can no longer escape as readily as before, a pressure will be built up in the chamber 24, thus collapsing the bellows 27 against the force of a loading spring 30. Upon contraction of bellows 27, a member 31, having one end contacting a seat 32 attached to the movable end wall of bellows 27, is shifted to the right to oppose the pressure change in chamber 8 and move a pen across chart 7. The member 31 extends through an opening in base plate 26 and is then off-set to pass beside the flapper 20 and a flange 33 formed on the abutment member 15. A pin 34 in the right end of member 31 engages one side of the flange 33, so that movement of member 31 to the right will shift the abutment member 15 to the right, along tube 14, to compress spring 16 and elongate bellows 10 in opposition to the pressure change in chamber 8. As the bellows 10 is extended by spring 16, the rod 18 will also be moved to the right to permit flapper 20, under the bias of its spring 22, to move away from nozzle 23, slightly reducing the pressure in chamber 24. A condition of equilibrium is thereby established by this follow-up movement of member 31 which leaves the parts in a new position proportional to the increased pressure in chamber 8.

In a like manner, a decrease in pressure in the fire box 2 of furnace 1 would decrease the pressure in chamber 8, permitting flapper 20 to move away from nozzle 23. Air escaping more readily from the nozzle reduces pressure in chamber 24, allowing bellows 27 to expand and member 31 to move to the left under the bias of spring 16 acting on abutment member 15, and that in turn on pin 34. As the force of spring 16 decreases, bellows 10 will collapse moving flapper 20 toward nozzle 23 to again establish a position of equilibrium proportional to the original pressure change in the fire box 2.

A pen-moving and controller-adjusting lever 36 is pivoted at 37 to the casing 6 and has a downwardly extending arm with a pin 35 in its lower end. The pin 35 extends freely through an opening in member 31 to engage the right side of the flange 33 on abutment member 15. A light spring is used to assist the weight of lever 36 in keeping the pin 35 against the flange 33. To the other arm of this lever 36 is attached an extension 38 which adjustably receives, in a slot 39, a pivot member attached to one end of a link 40. As will readily be seen, the movement of member 31 in response to pressure changes in chamber 8 will, by means of pin 35, move the lever 36 around its pivot 37 to raise and lower link 40.

Through operating connections, shortly to be described, longitudinal movements of the link 40 produce corresponding movements of a pen arm 41 which indicate the varying values of the furnace pressure and, by means of a pen attached thereto, will record said values on the record chart 7. Each movement of the link 40 also gives a corresponding movement to a lever 42 and thereby to a valve actuating element 43, and the movement of the latter effects a corresponding initial control force adjustment by changing the relative positions of a part containing a port-throttling element of a control valve.

The means through which the movements of link 40 are transmitted to the pen arm 41 and lever 42 comprise a bell-crank 44 (Fig. 3) journaled on a shaft 45 and having one arm connected to link 40, the other arm forming one leg of a yoke 46. The other leg of the yoke is extended to form pen arm 41. Movements of link 40 are transmitted to the lever 42 by an arm 46A fastened to move with the bell-crank 44 and a link 47 which is pivoted to both the arm and the lever. The normally stationary, but adjustable fulcrum point 48 for the lever 42 is carried by a supporting lever 49 which may be adjusted as hereinafter described. Movements of the lever 42 are transmitted to the valve actuating element 43 by a connecting link 50 to thereby effect a corresponding initial control force adjustment of a port-throttling element of a control valve.

The control apparatus through which the longitudinal movements of the link 50 produce control effects by giving movements to the actuating element 43 may take various forms. As shown, the control apparatus is an air actuated controller of a form which is fully disclosed in my Patent 2,125,081, dated July 26, 1938, and is now in extensive commercial use. The lever 43 is pivoted at 51 to an adjustable fulcrum member 52 in the form of a lever having a stationary fulcrum pivot 53. The movements of the lever 43 produce control effects by moving a flapper valve 54 away from or permitting it to approach a nozzle or bleed orifice member 55. The flapper valve 54 is mounted on a stationary pivot 56 and is biased for movement in the direction in which it approaches and restricts the discharge through the nozzle 55. The lever acts on the flapper 54 through a pin 57 carried by a depending arm of the lever.

The nozzle 55 receives air from a pipe 58 supplying air at a suitable and approximately constant pressure, through a restricted passage formed by a small bore pipe 59 (Fig. 2) included in a pilot valve mechanism 60, so that the pressure in the nozzle 55, which constitutes the primary control pressure of the control apparatus, increases and decreases as the flapper valve 54 moves toward and away from the nozzle. The primary control pressure is transmitted by a pipe 61 to a chamber 62 of the pilot valve mechanism. One wall 63 of that chamber is movable and separates the chamber 62 from a second pilot valve chamber 64. The pressure in the latter is regulated by a valve 65 actuated by the said movable wall 63. The pressure in the chamber 64 is thus maintained in constant proportion to the primary control pressure in the chamber 62 and constitutes the ultimate control pressure of the apparatus.

The ultimate control pressure is transmitted by a pipe 66 to the device to be controlled which, as shown in Fig. 2, is a fluid pressure motor damper controlling the draft of the furnace 1. The ultimate control pressure is also transmitted by pipe 67 to mechanism 68 forming a part of the control apparatus of Fig. 1, and adapted, following and as a result of each initial change in the ultimate control pressure effected through link 50, to give the lever 52 an initial follow-up adjustment and a delayed compensating adjustment. The follow-up adjustment neutralizes a portion of the initial adjustment of the flapper valve 54 effected by the link 50. The delayed compensating adjustment slowly neutralizes more or less of the effect of the preceding follow-up adjustment.

The mechanism 68 comprises bellows elements, two of which are connected by a connecting rod 69 which carries a projection 70. The latter acts on lever 52 through a lever 71 pivoted at 72 and a pin 73 interposed between the levers 71 and 52. The pin 73 is supported by a member 74 adjustable to vary the leverage with which the lever 71 acts on the lever 52. The latter is biased for movement in the clockwise direction, as seen in Fig. 1.

Details of the construction and operation of the mechanism, not specifically referred to herein, will be understood by those skilled in the art from the drawings, and need not be described herein, particularly as that mechanism is not only fully disclosed in said Patent 2,125,081, but is in extensive use. Moreover, the particular form of the control apparatus actuated by the longitudinal movements of the link 50 forms no part of the present invention, though it is an advantage of the present invention that it permits the ready combination with a measuring instrument of the character disclosed.

The operation of the device is as follows:

Assuming that there is an increase in the furnace pressure above that desired for economical operation, such increase will be reflected in chamber 8 to collapse bellows 10 and spring 16 an amount proportional thereto. The seat 17 on the movable end wall of the bellows will shift rod 18 to the left moving flapper 20 nearer nozzle 23, and thus building up the pressure in chamber 24. The consequent collapse of bellows 27 will shift member 31 to the right to oppose the pressure change in chamber 8 and readjust flapper 20 with respect to the nozzle 23. At the same time, pin 35 will turn lever 36 around its pivot 37 in a counter-clockwise direction to move link 40 upwardly.

Such a movement, through bell-crank 44, moves pen-arm 41 outwardly across the chart and, by means of arm 46A and link 47, lowers lever 42 around its pivot 48. As lever 42 moves down, link 50, connected thereto, will rotate actuating element 43 clockwise and, by means of pin 57, move flapper 54 away from orifice 55 permitting more air to escape therethrough. A consequent reduction in pressure in the chamber 62 permits end wall 63 to rise, thus closing valve 65 and reducing the pressure in chamber 64 and pipe 66. Such a reduction will allow a spring 75 in cylinder 76 to move piston 77 to the left and open the damper 3 in stack 4 to reduce the furnace pressure. A decrease in furnace pressure will cause a reversal of the above operation to close the damper 3.

The previously-mentioned adjustments of the fulcrum pin pivot 48 of the lever 42 are effected by adjustment of the lever 49 about its supporting shaft 78 which is coaxial with shaft 45. As shown, the lever 49 is adjusted by rotation of a knob 79 mounted in the instrument framework and frictionally held in any position to which it is adjusted. The knob 79 carries a crank arm 80 connected by a link 81 to a yoke extension of the lever 49. One leg of the yoke is extended to form an index or pointer 82 which indicates on the chart 7 the normal value of furnace pressure that the control apparatus is intended to maintain. When the actual value of the furnace pressure is equal to the normal value, as indicated by the pointer 82, the end of pen arm 40 will be the same radial distance from the center of the chart. By changing the setting of pointer 82 in the above-described manner, the relation of various parts of the control apparatus will be altered in such a manner that adjustments of the damper will maintain different furnace pressures.

The embodiment of Fig. 1 includes a type of controller which is operated responsively to a change in pressure in the chamber 24 through the mechanism including member 31, lever 36, link 40 and mechanism actuated by said link, but under some circumstances, it may be desirable to use the pressure variations in the chamber 24 to directly actuate some type of pneumatic motor to adjust the damper 3 in stack 4, or the equivalent thereof. Such a control system is disclosed in Fig. 4 and will now be described.

Inasmuch as the measuring and follow-up mechanisms of this modification are the same as those of Fig. 1, only the control mechanism and its relation to the measuring mechanism will now be described in detail. A branch duct 83, that may or may not be located outside of the casing 6, extends from duct 28 between the restriction 29 and the nozzle 23 so that any pressure changes in the chamber 24 will be transmitted through duct 83 to a bellows 84 at the end thereof. As bellows 84 changes in length, a bearing pin 85 on the movable end wall thereof bears upon the top of a lever 86, pivoted at 87 and biased upwardly by a spring 88, to oscillate this lever in accordance with changes in pressure in the chamber 24 and the space, the pressure of which is to be controlled. Oscillation of lever 86 is transferred to a second lever 89 pivoted at 90 and biased upwardly by a spring 91 by an adjustable pin 92. Adjustment of pin 92 lengthwise of levers 86 and 89 will vary the amount of movement of lever 89 for a given movement of lever 86, or the throttling range of the instrument as it is usually called.

Attached to lever 89, to reciprocate as that lever moves, is a valve stem 93 which extends into a chamber 94 and has two valves 95 and 96 on it. This stem 93 is normally biased upward by a spring 97 so that valve 95 will close an opening in the chamber wall, and valve 96 will be lifted off an air inlet 98 which connects with duct 28 before it reaches the restriction 29. Therefore, as the lever 86 is oscillated in accordance with pressure changes in the chamber 24, the valves 95 and 96 will vary the pressure in chamber 94 and the cylinder 76 connected therewith to adjust the opening of damper 3.

To adjust the normal condition value which the device tends to maintain, an adjustment corresponding to knob 79 is provided which comprises a member 111 which is rigid with the upper end wall of the bellows 84. A member 112 is fastened against axial movement in a projection 113 that may be attached to the frame of the instrument and is provided with screw threads that are received in an opening in the member 111. By rotating the member 112, the upper end of the bellows 84 may therefore be raised and lowered and thus adjust the initial position of pin 85 with respect to lever 86 to vary the control point of the instrument.

In its operation, a pressure increase in the combustion chamber of furnace 1 will cause flapper 20 to be moved toward nozzle 23, as above described. The resulting pressure increase in chamber 24 and bellows 85 will, by means of lever 86, pin 92, and lever 89, move the valve stem 93 downward. Such a movement permits valve 95 to open chamber 94 to the atmosphere and valve 96 to close the end of duct 98, thereby decreasing the pressure in chamber 93 and cylinder 76. This decrease in pressure permits spring 75 to raise piston 77 and open the damper to restore the furnace pressure to its normal value.

At times, it is desirable to measure the pressure drop between two points in the path of the heated gases of a furnace. An instrument to accomplish this purpose is disclosed in Fig. 5 and includes the measuring part of the instrument of Figs. 1 and 4 with the addition of another chamber which is to be subjected to the second unknown pressure. If, for example, it is desired to record the pressure differential in furnace 1 between the combustion chamber 2 and the space 110, which would normally be at a lower pressure, one of the chambers of the measuring instrument would be in communication with combustion chamber 2 and the other in communication with space 110. If these chambers are provided with movable end walls whose motions, upon an increase in pressure, are opposed, an algebraic effect corresponding to the pressure differential will be obtained. Such differential pressure measurement may be desirable in measuring air flow through the furnace. To accomplish this, certain of the parts of the measuring instrument of Figs. 1 and 4 have been rearranged and other parts added, but those parts that are duplicated in this embodiment, shortly to be described, are designated by the same reference numerals they were previously given, despite their change of position.

As is shown in the drawings, the bellows 10 and cap 9 that together form the chamber 8, which in this embodiment is in communication with space 110 by means of duct 99, are mounted in a vertical position on the support 12. Below and spaced from the base plate 11, upon which the bellows 10 is mounted, is another base plate that has mounted on its lower side a bellows 100 and a cap 101, which together form a chamber 102 that is connected by a duct 5 with the combustion chamber of furnace 1 in Fig. 2. The movable end wall of bellows 100 is connected by a strap 103 with the movable end wall of bellows 10 so that they will move together. Due to this connection, any increase in the pressure differential between the chamber 2 and the space 110 of the furnace will cause the strap to move upwardly, and any decrease in the pressure differential will cause the strap to move downwardly. As the movable end of bellows 10 changes its position, upward for an increase and downward for a decrease in the differential, rod 18 will be likewise shifted to vary the position of the flapper 20 with respect to the nozzle 23.

Since the rod 18 will move in the same directions as the strap 103, it will move upwardly upon an increase in the differential pressure to permit spring 22 to lift flapper 20 from nozzle 23 and thus allow more air to escape from the chamber 24 so that the bellows 27 can expand under the bias of spring 30. Conversely, a decrease in the pressure differential would cause flapper 20 to be moved toward nozzle 23, thus allowing less air to escape therethrough, and thereby building up pressure in chamber 24 to compress the bellows 27. As shown in Figure 5, the right end of spring 30 is seated on a ledge of a screw-threaded member 104 that is adjustable in base plate 26 to adjust the initial position of the bellows. There is also provided a sleeve 105, attached to base plate 26, which will act as a stop to limit the collapsing movement of the bellows. Parts corresponding to 104 and 105 could also, if desired, be used in the modifications of Figs. 1 and 4.

Expansion and contraction of bellows 27 due to a pressure change in chamber 24 will produce a longitudinal movement of a link 106 that is adjustably pivoted in a slot 107 of a bell-crank lever 108, which is in turn pivoted at 109. Attached to the horizontal arm of the bell-crank is the extension 38 which is connected with link 40 that moves the pen.

Figure 5:
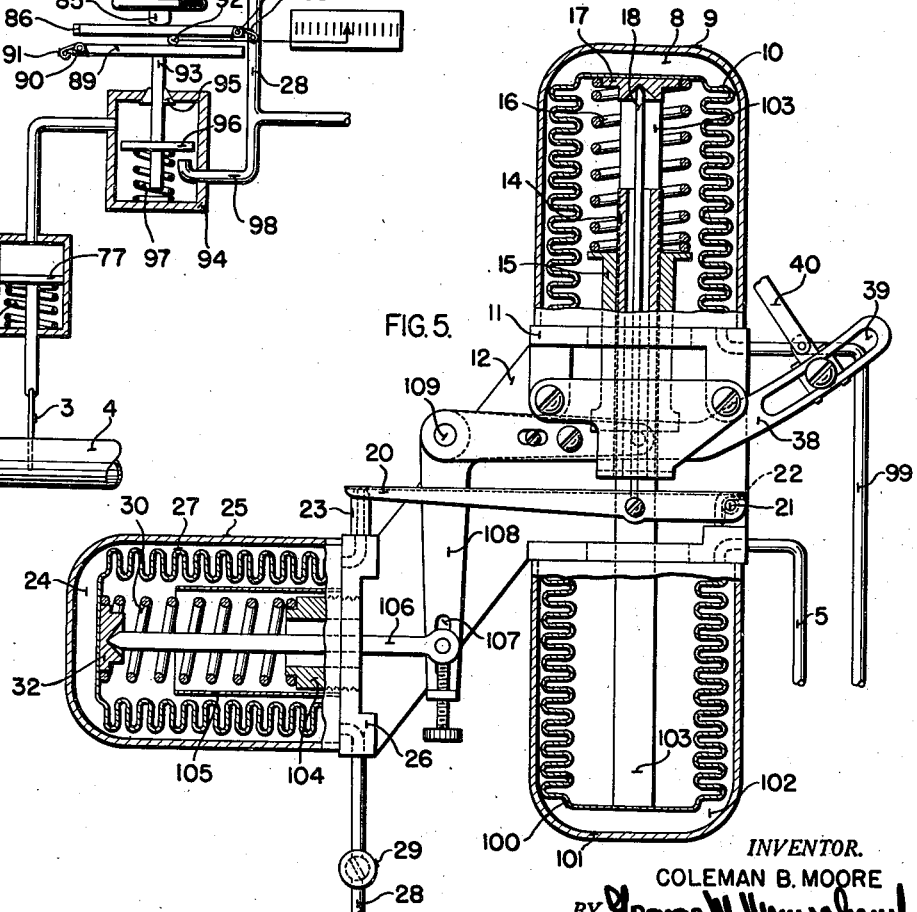
Fig. 5 is a view partly in section of apparatus incorporating my invention to measure a differential pressure.

The control system of either Figs. 1 and 2, or Fig. 4, may be used with the measuring element of Fig. 5. In the first case, movement of link 40 by member 106 will move the pen arm 41 across the chart and, at the same time, shift lever 42 and link 50 to actuate the controller. In the second case, if the control system of Fig. 4 is used, pressure variations in chamber 24 will vary the length of bellows 84 to actuate that controller. It is noted that in measuring and controlling a static pressure, such as that in combustion chamber 2, when an increase in the pressure occurs, the damper 3 must be opened, and when a decrease occurs, the damper 3 must be closed. Whereas, when measuring and controlling a differential pressure between combustion chamber 2 and space 110, when the pressure differential increases, the damper 3 must be closed, and when the pressure differential decreases, the damper 3 must be opened.

In the operation of this modification, upon the occurrence of a decrease in the pressure differential due to either a decrease in pressure in combustion chamber 2 or an increase in pressure of space 110, the rod 18 will be moved downwardly thereby moving flapper 20 toward nozzle 23 to restrict the flow of air therethrough. The resultant pressure increase in chamber 24 will collapse bellows 27 moving member 106 to the right and bell-crank 108 counterclockwise. This shifts link 40 upwardly to move the pen across the chart.

At this point, it should be noted that in this embodiment of the invention the pen 41 will be moved to the right upon the occurrence of a decrease in the pressure differential. This, in the usual form of instrument, will necessitate placing the pen on the left side of the chart instead of the right, as shown in Fig. 1. The index 82 will also, for convenience, be placed on the left side of the chart along with the pen. Such a change of the pen is a mere matter of adjustment to make it conform with a standard chart that has its zero-point near the center thereof.

If the controller of Fig. 1 is being used, levers 46A and 42 will be moved counter-clockwise around their respective pivots to lower link 50 and move member 43 clockwise. Such a motion shifts pin 57 so that flapper 54 is moved away from nozzle 55 to reduce pressure in chamber 62. As the pressure decreases in chamber 62, the movable wall 63 will move valve 65 upwardly so that pressure can be reduced in chamber 64 and the cylinder 76, thus permitting piston 77 to move to the left under the force of spring 75 and open the damper 3.

If a controller of the type shown in Fig. 4 is being used, the increase in pressure in chamber 24, due to a decrease in the pressure differential, will result in an elongation of bellows 84 to move valve stem 93 downward, and pressure will decrease therein and in cylinder 76 to permit piston 77 to move upwardly so that damper 3 can open the stack 4.

Upon an increase in the pressure differential between combustion chamber 2 and space 110, it will be obvious that a reverse of the above-described operations will take place and the damper will be closed.

The embodiment of the invention shown in Fig. 5 may, by a simple change, also be used as an absolute pressure gauge and regulator. This can be accomplished by evacuating the chamber 102 and sealing off the opening 5. In such a case, the pressure that is being measured would be in communication with the chamber 8 and would therefore be opposed by the vacuum in the chamber 102 so that the strap 103 will be moved to a position corresponding to the absolute pressure. Changes in atmospheric pressure are automatically compensated for since the inside of both bellows 10 and bellows 100 are in communication with the atmosphere. Therefore, an atmospheric change will exert an equal force against both of the bellows and will consequently balance itself out.

While my pressure controller has been described as being used to regulate a damper, I do not wish to limit myself to such use. The regulator can be used any place that a pressure control is necessary. For example, by the use of bellows of proper strength, the embodiment of Fig. 5 can be used as a manometer to measure flow if the ducts 5 and 99 are connected to a pipe on opposite sides of some differential creating device, such as an orifice plate. Although I have described the regulator as being designed for low pressures, it will be obvious that by substitution of various bellows the regulator can be used for pressures of any desired value.

The entire mechanism is a single compact unit rather than a system of liquid tanks, floats, rocker arms and knife-edge pivots, and is accordingly more stable in operation and requires less delicate handling than most low pressure controllers. Because of the fact that a pneumatic balance system is used, the pen will take its correct position in spite of friction and an unlevel position of the case.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a pressure regulator, the combination with a first chamber adapted to be subjected to various pressures, a wall therefor movable in response to changes in pressure in the chamber, a second chamber in non-communicating relation with said first chamber and having a bleed nozzle therein, a source of fluid under constant pressure supplied to said second chamber and escaping through said nozzle, a flexible wall for said second chamber movable in response to pressure changes therein, means responsive to movement of the wall of said first chamber due to changes in pressure in said first chamber to throttle the flow through said bleed nozzle and thereby alter the pressure in said second chamber to adjust its movable wall, and means actuated by movement of the movable wall of said second chamber to adjust the wall of said first chamber and thereby readjust said throttling means.

2. In a pressure regulator, the combination with a chamber subjected to a variable pressure to be regulated, a wall therefor movable in response to changes in said pressure, means yieldably opposing said movement, means responsive to movements of said wall to change the adjustment of said yielding means in a direction to overcome said movements, and means actuated by said responsive means to regulate said pressure toward its original value.

3. In a pressure regulator, the combination with a member movable in response to variations in a pressure to be regulated, means to resiliently oppose said movement, a chamber having a movable end wall and a bleed nozzle, a source of fluid under constant pressure supplied to said chamber and escaping through said nozzle, means responsive to movement of said member to vary the escape of air through said nozzle and thereby vary the pressure in said chamber to move its end wall, and means responsive to movements of said end wall to adjust said resilient opposing means.

4. In a pressure regulator, the combination with a chamber adapted to be subjected to varying pressures, a flexible wall for said chamber comprising a bellows extending therein, a tube extending into said bellows, a sleeve slidable on said tube, a compression spring having one end abutting said sleeve and the other end abutting the end wall of said bellows whereby, as said end wall moves in response to pressure changes, said spring will be expanded or contracted, and means including a deformable pressure responsive member responsive to a movement of said wall to move said sleeve in a direction opposite to the wall's movement to compensate for said pressure change.

5. In a pressure regulator, the combination with a pair of opposed chambers, opposed movable end walls in said chambers, one of said chambers being subjected to a variable pressure whereby its end wall will be moved in accordance with pressure variations therein, the other of said chambers having an opening therein and being supplied with a fluid that escapes through the opening, means responsive to movements of the wall of the first chamber to variably close said opening to thereby vary the pressure in said other chamber and move its wall, and mechanical means operated by movement of the wall of said other chamber to directly readjust the first wall toward its original position and to regulate the pressure to which the first chamber is responsive.

6. In a pressure regulator, the combination with a first means movable in response to variations in a condition, a second movable means, mechanism responsive to movement of said first means to cause movement of said second means, a controller for the condition to which said first means is responsive, and mechanical means responsive to movement of said second means to oppose the motion of said first means directly and move the first means toward its original position, and operate said controller to vary said condition.

7. In a pressure regulator, the combination with a chamber, one end of which comprises a bellows, the interior of said chamber being subjected to a variable pressure whereby said bellows will be moved in response to variations thereof, a member moved in response to movements of said bellows, mechanism operated by said member including a second bellows and a thrust member operated thereby to restore said first bellows substantially to its initial condition in opposition to the variation in said pressure, and means operated by said thrust member to tend to restore said pressure to its initial value.

8. In a regulating apparatus, the combination with a member movable in response to a variable condition, means resiliently opposing said movement, a second member responsive to movement of said first member, means actuated by movement of said second member to adjust said resilient means in opposition to the movement of said first member and thereby restore said first member and said second member to substantially their original conditions, and means actuated by said second member to control the condition to which said first member is responsive.

9. In a regulating apparatus, the combination with a chamber having a movable wall, said chamber adapted to be subjected to a variable pressure and said wall adapted to be moved in response to variations thereof, a second chamber having a movable wall and a bleed nozzle, a source of fluid for said second chamber, said fluid escaping through the nozzle, a flapper valve for said bleed nozzle, means actuated by the wall of said first chamber to move said flapper relative to said nozzle and thereby variably throttle the flow therethrough to change the pressure of the fluid in said second chamber whereby the wall thereof will be moved, mechanism actuated by movement of said second wall to restore the first wall substantially to its initial position, and means also actuated by said mechanism to regulate the pressure to which said first chamber is responsive 10. In a pressure regulator, the combination with a first chamber having a movable wall adapted to be subjected to a variable pressure, a second chamber having a movable wall subjected to a second variable pressure, an element connecting said walls together whereby movement of one or the other in response to variations in either pressure will shift said element and the other wall, a member operative to oppose movement of said element, means responsive to movements of said walls to directly adjust said member to restore said walls to substantially their original positions, and mechanism actuated by said member to regulate said variable pressures to their original relative values.

11. In a pressure regulating apparatus, the combination with a first and a second opposed chamber adapted to be subjected to different variable pressures, movable walls in said chambers to move in response to pressure variations therein, an element connecting said walls whereby changes in position of either wall due to pressure variations will be communicated to the other wall, a third chamber having a movable wall therein, means responsive to movements of the first two walls to move said third wall, and a lever actuated by movement of said third wall to return said first two walls to substantially their original positions.

12. In a measuring and control instrument, the combination with a first member movable in response to variations in a condition, a second member movable in response to variations in a second condition which normally has a definite relation to the first condition, means connecting said members for simultaneous movement whereby as one member moves in response to variations in the condition to which it is responsive, the other member will also be moved, means responsive to movement of said members to oppose their movements, and mechanism actuated by said means to restore the normal relation to the variable conditions.

13. In a measuring and control instrument, the combination with a pair of opposed chambers, a separate bellows forming a wall of each chamber whereby as said chambers are subjected to varying pressures the bellows will be changed in length, a third chamber having a bellows forming a wall thereof, a supply of fluid therefor and a bleed nozzle through which said fluid escapes, means responsive to movements of said first two bellows to variably throttle the opening of said nozzle and thereby alter the pressure in said third chamber to change the length of its bellows, mechanism responsive to movement of said third bellows to return said first two bellows to substantially their initial length, and means actuated by said mechanism to vary the pressures in said first two chambers.

14. In a measuring and control instrument, the combination with a first chamber adapted to be subjected to a variable pressure, an end wall therefor movable in response to pressure variations therein, a second chamber in non-communicating relation with said first chamber and having a movable end wall also adapted to be moved in response to pressure changes in its chamber, a source of fluid supply for said second chamber and a bleed nozzle in said chamber through which said fluid can escape, a member movable in response to movements of said first wall to variably throttle the opening of said bleed nozzle and thereby change the pressure in said second chamber, and means actuated by pressure changes in said second chamber to tend to restore the pressure in said first chamber to its original value.

15. In a pressure regulating instrument, the combination with a first member movable in response to variations in a controllable pressure, a second member also movable in response to pressure variations to which it is subjected, a pressure actuated valve, means responsive to movements of said first member to vary the pressure to which said second member is subjected to thereby move said second member, mechanism operated by movement of said second member to return said first member substantially to its original position, and means also responsive to the pressure to which said second member is responsive to adjust the pressure on said valve.

16. In a measuring and control instrument, the combination with a space, the pressure of which is to be controlled, a valve, the opening of which varies the pressure in said space, means to adjust said valve in accordance with the pressure in said space, said means comprising a member responsive to the pressure in said space, a part moved thereby, a second member responsive to the movement of said part, an arm moved by said second member, means operated by said arm to return said member toward its original position and control apparatus for said valve operated in accordance with movements of said arm.

COLEMAN B. MOORE.